United States Patent [19]
Battigelli et al.

[11] 4,203,745
[45] May 20, 1980

[54] GLASS FIBERIZATION BY CENTRIFUGAL FEED OF GLASS INTO ATTENUATING BLAST

[75] Inventors: Jean A. Battigelli; François Bouquet, both of Rantigny, France

[73] Assignee: Saint-Gobain Industries, Neuilly-sur-Seine, France

[21] Appl. No.: 27,617

[22] Filed: Apr. 6, 1979

[30] Foreign Application Priority Data

Dec. 8, 1978 [FR] France .................. 78 34616

[51] Int. Cl.² .................................. C03D 37/04
[52] U.S. Cl. ............................... 65/6; 65/14
[58] Field of Search ................... 65/1, 2, 6, 14

[56] References Cited

U.S. PATENT DOCUMENTS

| | | | |
|---|---|---|---|
| 2,936,480 | 5/1960 | Kleist | 65/6 |
| 3,152,878 | 10/1964 | Levecque et al. | 65/14 |
| 3,304,164 | 2/1967 | Charpentier et al. | 65/14 |
| 3,393,986 | 7/1968 | Firnhaber | 65/6 X |
| 3,503,726 | 3/1970 | Weck | 65/8 X |
| 3,622,293 | 11/1971 | Firnhaber | 65/14 |
| 3,759,680 | 9/1973 | Kleist et al. | 65/6 |
| 3,928,009 | 12/1975 | Perry | 65/14 |

FOREIGN PATENT DOCUMENTS 191223  9/1964  Sweden .................. 65/6

*Primary Examiner*—Robert L. Lindsay, Jr.
*Attorney, Agent, or Firm*—John T. Synnestvedt; Kenneth P. Synnestvedt

[57] ABSTRACT

In the technique for fiberizing glass by the use of a centrifugal spinner delivering glass streams into an attenuating blast, a novel spinner construction is provided, and provision is also made for increasing the production, while also providing for the use of glass of lower cost, and at the same time, reducing environmental pollution. Glass compositions and spinner alloy compositions particularly suited for use in accordance with the invention, are also disclosed.

20 Claims, 12 Drawing Figures

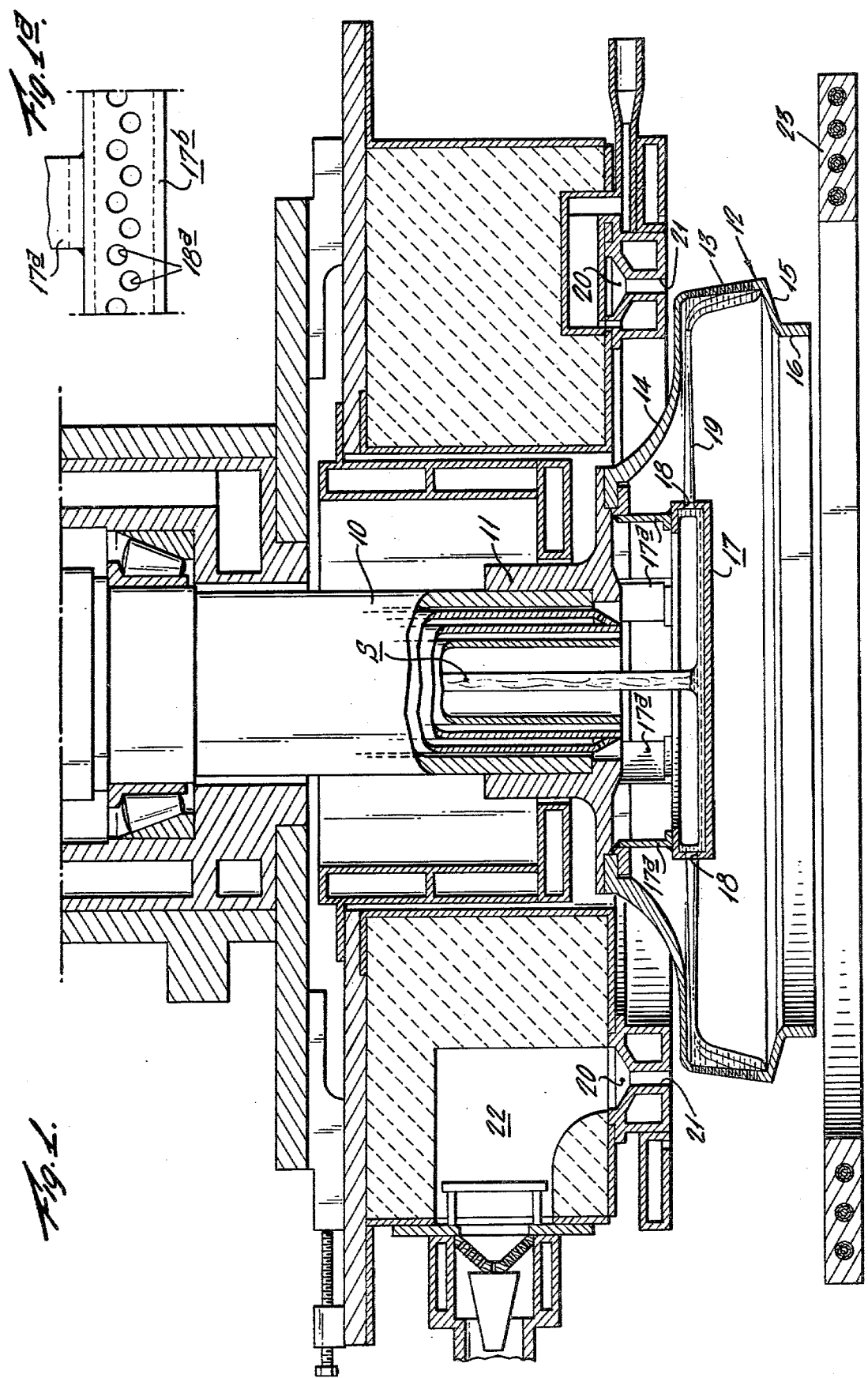

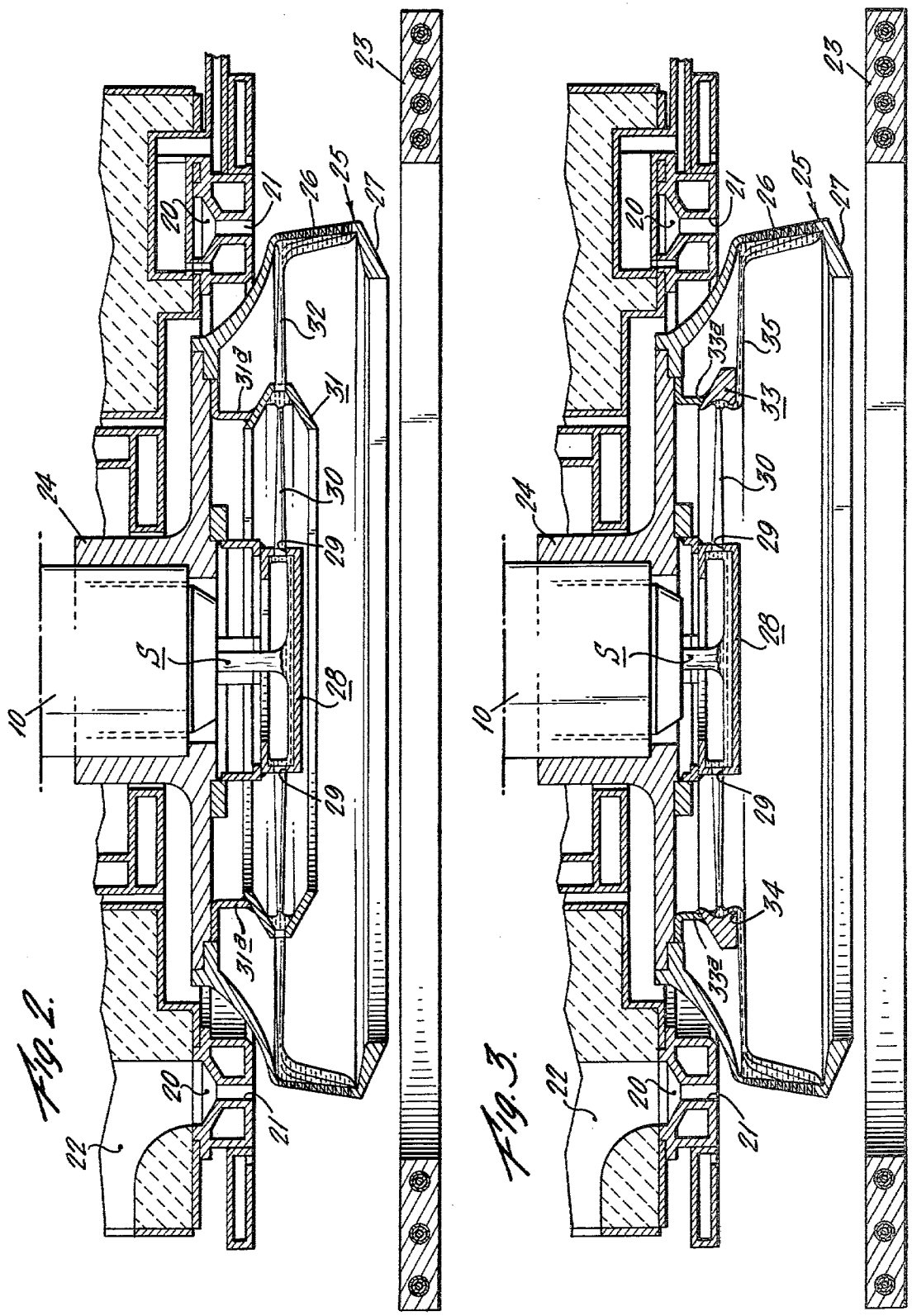

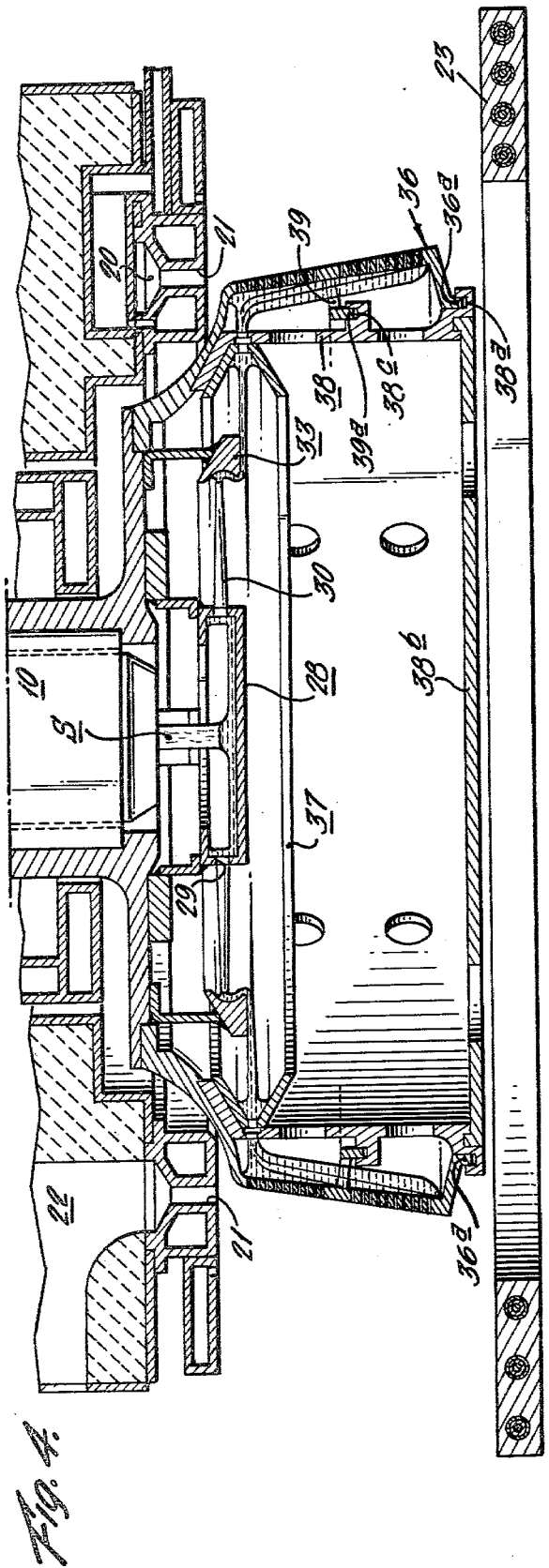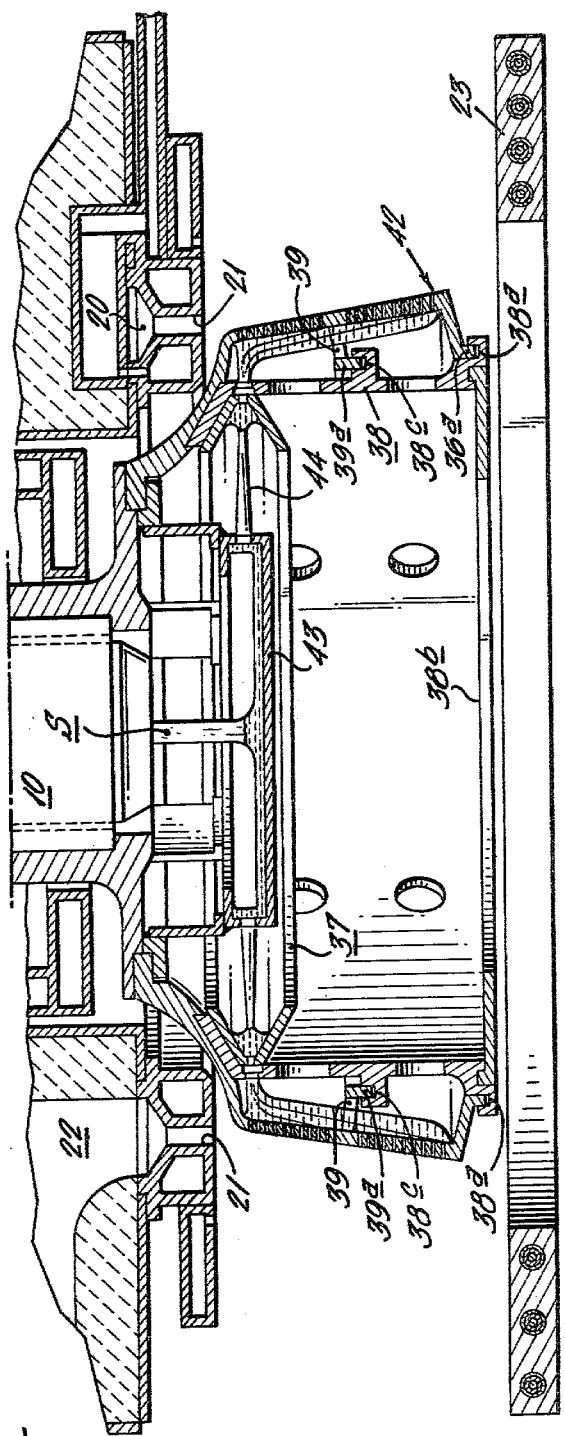

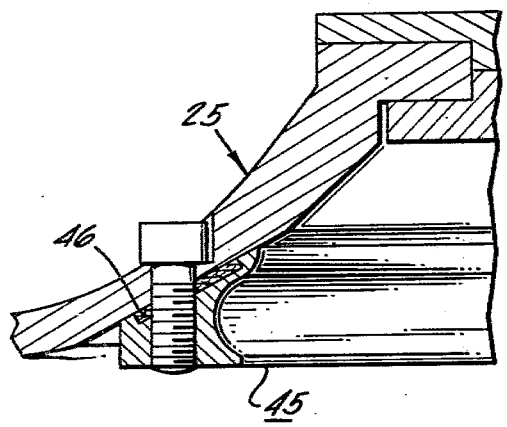
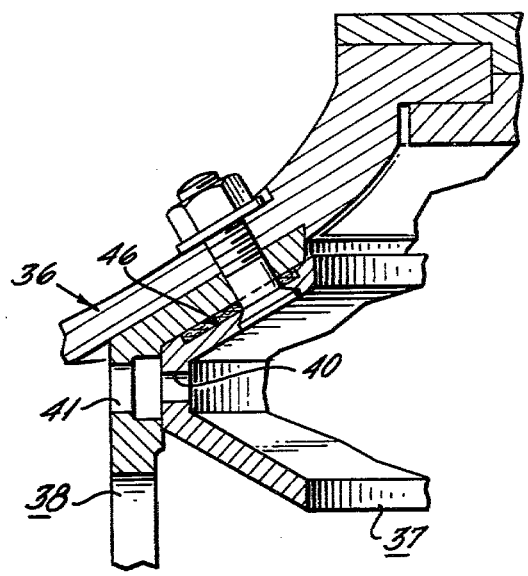
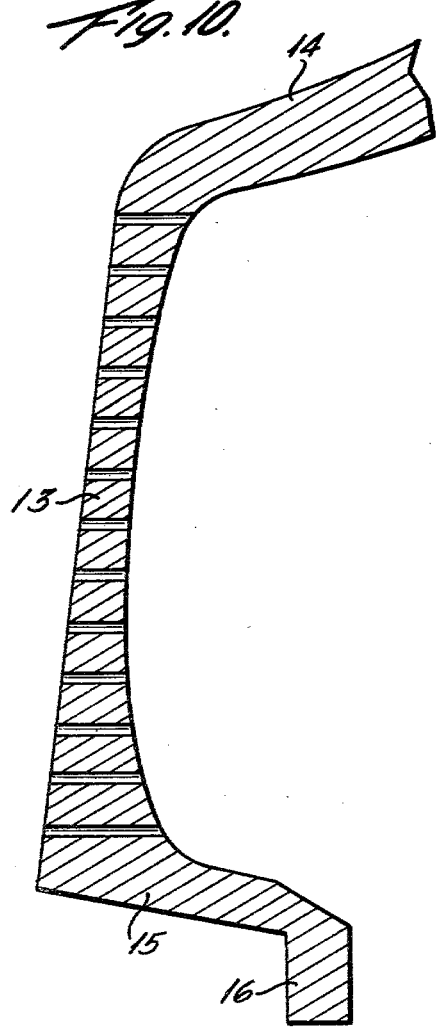
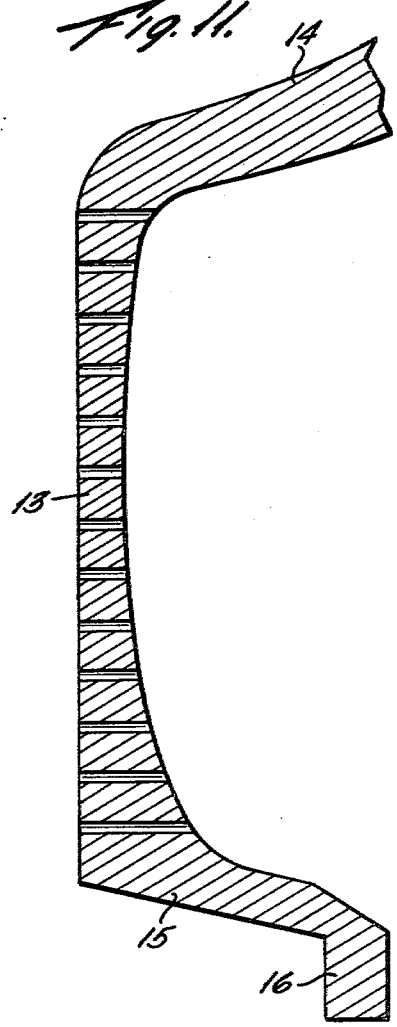

4,203,745

GLASS FIBERIZATION BY CENTRIFUGAL FEED OF GLASS INTO ATTENUATING BLAST

TABLE OF CONTENTS

In connection with the following listing of the headings and in connection with the text of the specification, it is to be understood that not all of the text following each heading is necessarily concerned only with the subject of the heading, because in numerous places the interrelationship of different features is explained.

TABLE OF CONTENTS
BACKGROUND
STATEMENT OF THE INVENTION AND OBJECTS
BRIEF DESCRIPTION OF THE DRAWINGS
DETAILED DESCRIPTION OF FIGS. 1 AND 1a
OPERATING CONDITIONS AND PARAMETERS
FIGS. 10 AND 11
ADDITIONAL STATEMENT OF PARAMETERS
DETAILED DESCRIPTION OF FIGS. 2 TO 9 INCLUSIVE
GLASS COMPOSITIONS
SPINNER ALLOY
CLAIMS
ABSTRACT

BACKGROUND

The present application is concerned with improvements in the technique for fiberizing glass or similar thermoplastic materials, especially mineral materials, in which a centrifugal spinner is employed, usually mounted on an upright axis, a stream of glass being fed into the interior of the spinner and being delivered to the inside surface of a peripheral wall of the spinner in which a multiplicity of orifices are provided, so that upon rotation of the spinner, the glass is projected by centrifugal force in streams or "primaries" from the orifices in the peripheral wall of the spinner. Provision is made for delivering an annular stream of attenuating gas in the form of a blast from a combustion chamber, the annular stream being directed downwardly adjacent to the outside surface of the perforate peripheral wall of the spinner, whereby the streams of glass are attenuated and usually also coated with a binder and are then carried downwardly in the attenuating blast to the upper surface of a foraminous collecting conveyor, usually arranged as the bottom wall of a collecting chamber. In a typical installation, suction boxes are disposed below the foraminous collecting conveyor in order to assist in the production of a mat or blanket of the fibers on the conveyor, which blanket is carried away for further treatment, packaging, etc.

In commonly employed systems of this known type, it has been customary to employ so-called "soft" glasses, i.e., glass compositions which are specially formulated to have temperature/viscosity characteristics providing a viscosity which will pass freely through the orifices in the spinner wall at a temperature well within the limits of the temperature which the material of the spinner is capable of withstanding without excessive corrosion and deformation.

For the above purpose, the glass compositions employed have customarily incorporated appreciable quantities of one or more barium, boron, and fluoride compounds, which tend to lower the melting temperature, devitrification or liquidus temperature and the viscosity, and which have therefore been effective in avoiding the necessity for employment of molten glass at excessively high temperatures.

However, the use of compositions containing substantial amounts of boron or fluorine or even barium requires that certain precautions be taken, especially in the case of boron and fluorine because objectionable volatile constituents may be developed and carried through and out of the molten glass production system and, in this event, if this possibility of pollution is to be avoided, special treatment of the discharged gases would be necessary in order to separate and appropriately dispose of those constituents.

Barium, boron and fluorine compounds have heretofore been present in the glasses used, typically in amounts respectively about 3%, 6% and 1.5%, but boron and fluorine compounds commonly employed are volatile at the fusion temperature employed in the glass manufacture and fluorine is even volatile at the temperature employed in fiberization; so that to provide this content of those ingredients requires initial use of larger amounts in the preparation of the glass, because of the losses due to volatilization at glass fusion temperatures.

Still another objection to the employment of substantial quantities of these compounds is the fact that they tend to increase the cost of the fibers being produced. This latter objection is especially so of barium compounds, which are particularly expensive. In addition, the relatively "soft" glasses result in production of glass fibers which are not as highly temperature-resistant as is desirable.

Various factors heretofore encountered in this type of fiberization technique have also tended to limit the production capacity of a given plant facility.

STATEMENT OF THE INVENTION AND OBJECTS

Having in mind the foregoing, it is a general objective of the present invention to overcome the problems and disadvantages of the prior techniques above referred to.

Thus, the invention contemplates increasing the production of a given plant facility of the kind employing a centrifugal spinner delivering streams of glass into an annular attenuation blast surrounding the spinner; while at the same time, substantially eliminating certain sources of pollution, making possible the use of glass compositions of lower cost, and providing a fiber product having improved temperature-resistant characteristics.

With fibers made by a perforated spinner from prior art compositions, insulation products can only be used in applications in which they are exposed to temperatures not substantially in excess of about 400° C.; whereas, with fibers produced from certain compositions according to the invention, the corresponding temperature may rise to about 480° C.

Various of the foregoing general objectives are achieved by employment of a number of important improvements herein disclosed individually or in various combinations, including the operating conditions, the method and equipment employed for feed and distribution of the glass in the spinner, the construction of the spinner itself and also the composition of the glass, as well as the composition of the alloy from which the spinner is formed. Various of these features are interrelated as will be explained hereinafter.

It is here further noted that the techniques herein disclosed are also disclosed in certain other concurrently filed and related U.S. applications, all of which claim convention priority from French Application No. 78.34616 filed Dec. 8, 1978.

Turning first to the composition of the glass (examples being given hereinafter), while the method and the equipment including the spinner construction may be used with presently used compositions, it is contemplated in the preferred practice of the invention that the glass composition be formulated to contain no fluorine and little if any barium and boron. Such glass compositions are "hard" glasses, having higher melting and devitrification temperatures. Indeed, the characteristics of fluorine-free compositions and even boron-free as well as barium-free compositions, although impractical for fiberization by prior spinner techniques, may readily be fiberized by the method and equipment herein disclosed. Moreover, these hard glasses also result in production of "hard" glass fibers which is desirable from the standpoint of enhanced temperature performance.

Such hard glass compositions, having elevated devitrification temperatures and achieving suitable fiberizing viscosity only at higher temperatures, require special handling and special fiberizing equipment, and the technique disclosed contemplates a number of significant improvements in the spinner construction, in the method and means for delivering and distributing the glass in the spinner, and in the operating conditions established in the spinner, facilitating making fibers from these hard glasses and even providing for fiberization of certain very hard glass compositions which would be difficult, if not impossible to fiberize with known spinner construction and techniques.

It is here also noted that certain of these structural and operational improvements, while of special importance and advantage in the fiberization of hard glasses are also of advantage when used with other kinds of glass which may be fiberized by the "centrifugal" technique under consideration.

These structural and operational improvements can best be explained after consideration of equipment preferably used in the techniques herein disclosed, and reference is therefore now made to the drawings and to the following description of the drawings.

BRIEF DESCRIPTION OF THE DRAWINGS

FIG. 1 is a vertical sectional view, with some parts in elevation, showing a fiberization production unit incorporating a spinner constructed according to one preferred embodiment of the novel techniques herein disclosed, and having a blast generator for delivering an annular attenuating blast downwardly adjacent to the peripheral wall of the spinner;

FIG. 1a is an enlarged fragmentary view of an alternative feature which may be incorporated in the embodiment of FIG. 1;

FIGS. 2, 3, 4, 5 and 6 are partial views similar to FIG. 1, each illustrating another embodiment of the spinner and the glass feed mechanism within the spinner;

FIG. 7 is an enlarged fragmentary sectional view illustrating an arrangement for mounting a glass feeding device within a spinner; such as shown in FIG. 6;

FIG. 8 is an enlarged fragmentary sectional view illustrating an arrangement for mounting another form of glass feeding device such as shown in FIGS. 4 and 5;

FIGS. 10 and 11 are fragmentary sectional views through alternative forms of the peripheral wall of the spinner.

DETAILED DESCRIPTION OF FIGS. 1 AND 1a

Figure 6:
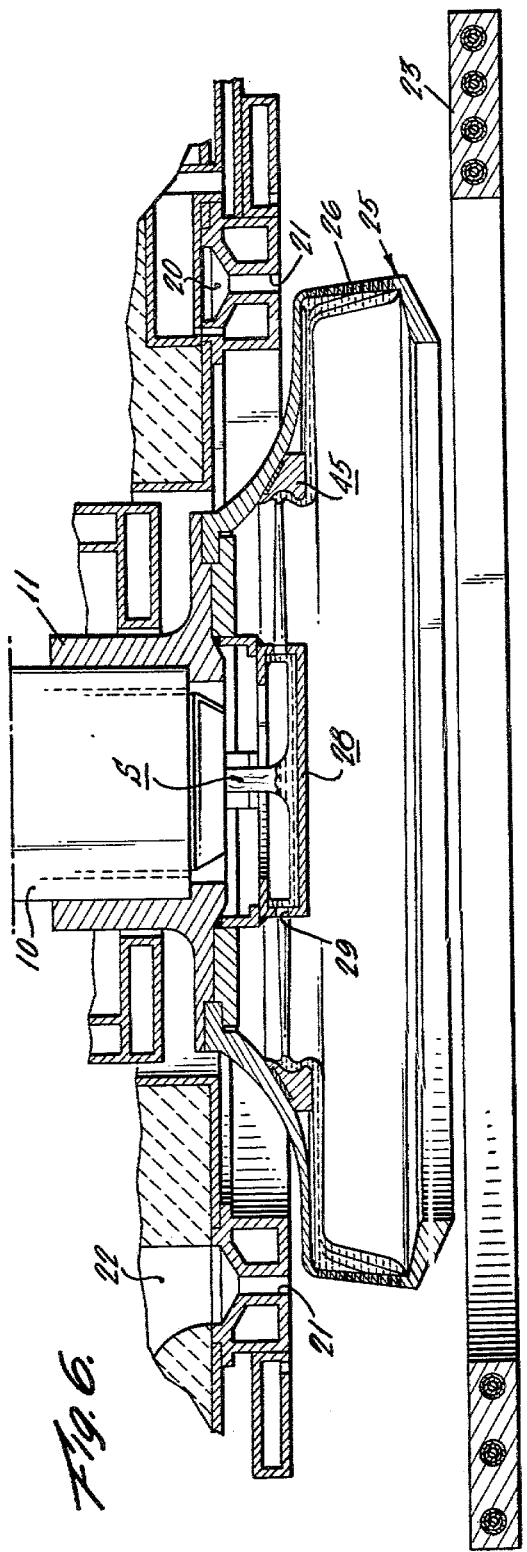
Figure 9:
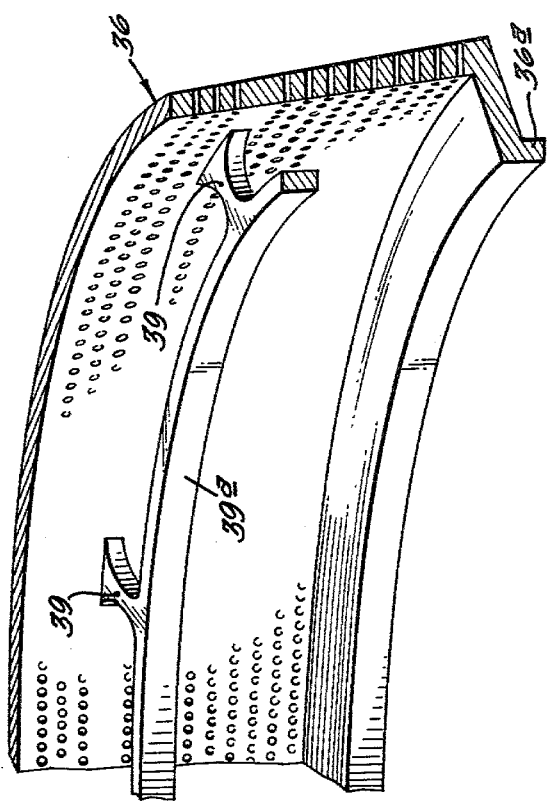
FIG. 9 is a fragmentary perspective view of spinner bracing structure for spinners such as shown in FIGS. 4 and 5.

Referring first to the embodiment of FIG. 1, a vertical spinner supporting shaft is indicated at 10, this shaft carrying at its lower end a hub for mounting the spinner, the hub being indicated at 11. The spinner itself is indicated in general at 12. The spinner is made up of a peripheral wall 13 having a multiplicity of rows of spinner orifices, and the upper edge of the wall 13 is connected to the hub 11 by the central mounting portion or neck 14. The orifices in the spinner wall are illustrated only in the sectioned portions of the spinner wall but it is to be understood that a multiplicity of orifices are provided in each of a plurality of vertically spaced rows of orifices. At its lower edge, the spinner is provided with an inwardly projecting flange 15 to which the upper edge of a cylindrical part or element 16 is connected, this cylindrical part serving a reinforcing or bracing function, as will further be explained.

Mounted within and rotating with the spinner is a distributing basket 17 having a single series of distributing orifices 18 which are located substantially in the plane of the uppermost row of orifices in the peripheral wall of the spinner. As shown, the basket 17 is mounted on the hub 11 by means of depending brackets 17a. A stream of glass is delivered downwardly and centrally through the spinner mounting structure, as is indicated at S, being delivered to the inside of the bottom wall of the basket 17, and spreading laterally on that bottom wall to the perforate peripheral wall of the basket, so that the glass builds up a layer on the inside of the basket wall, from which streams indicated at 19 are projected through the orifices radially outwardly to the inside surface of the peripheral wall of the spinner adjacent to the uppermost row of orifices from which zone the glass flows downwardly on the inside surface of the spinner wall. This downward flow is unobstructed, there being no interior confining wall or chamber structure inside of the peripheral wall, and the flow has laminar characteristics, when viewed under stroboscopic light, in which there is the appearance of smooth waves. It is from this unobstructed or unconfined laminar flow layer that the glass enters the orifices in the peripheral wall of the spinner and is projected therefrom outwardly from all of the spinner orifices, in a multiplicity of streams or primaries which are subjected to attenuation by the annular gas blast which is established by equipment described hereinafter.

FIG. 1a shows an alternative distributor basket 17b having two rows of orifices 18a arranged in staggered fashion but all positioned close to a common plane for delivering the glass to the region of the uppermost row of orifices in the spinner wall.

In connection with the arrangement of the distributor basket (17 in FIG. 1 and 17b in FIG. 1a), it is pointed out that most of the distributor baskets employed in prior art techniques are provided with several rows of orifices vertically spaced from each other in order to provide for distribution of the glass to the perforated peripheral wall of the spinner throughout much of the vertical dimension of the perforate spinner wall. We have found, however, that in providing the multiplicity of orifices required to effect the vertical distribution of the glass in accordance with the common technique of the prior art, certain disadvantages and difficulties were encountered, especially in connection with spinners of relatively large size, both with respect to diameter and vertical height of the perforate peripheral wall.

One of the most important problems relates to heat loss from the streams of glass being delivered from the distributor basket to the inside of the peripheral wall of the spinner. Such heat loss is directly proportional to the total surface area of the delivered streams. With a large number of small streams, as in prior arrangements, the total surface area is much greater than with the arrangement herein disclosed in which the distributor basket is provided with only one row of orifices of larger size, thereby effecting delivery of the same quantity of glass with much smaller total surface area. Indeed, in a typical case, the arrangement as herein disclosed provides for delivery of a given quantity of glass in streams having only about 1/7 of the surface area of prior arrangements.

The improved arrangement therefore eliminates the excessive heat loss from the glass being delivered from the distributor basket to the peripheral spinner wall, which was a major disadvantage of the prior art equipment. Moreover, with the smaller streams of glass used in prior techniques, the temperature loss in delivery from the distributor basket to the peripheral wall of the spinner is much less uniform as between different streams, than is the case where a smaller number of larger streams are provided, as in the arrangement of the present invention.

Although the foregoing problems of heat loss were not considered to be prohibitive when using the softer glasses employed in the proir art techniques, when using the harder glasses herein contemplated, such heat losses can not be tolerated.

Another factor of importance is that the technique herein disclosed contemplates increasing the diameter of the spinner. With glass streams of small diameter delivered from the distributor basket, as in prior arrangements, the increase in the spinner diameter tends to result in fluttering of the streams thereby adversely influencing uniformity of operating conditions. The use of a smaller number of larger streams overcomes such fluttering. Other means for reducing such fluttering tendencies are described hereinafter with reference to embodiments shown in FIGS. 2 to 6.

Still further, with many smaller streams of glass delivered to the inside of the perforate peripheral spinner wall throughout most of the perforate area of that wall some of the streams arrive at the perforated wall in substantial alignment with individual perforations in the wall, whereas others arrive at the perforated wall in imperforate areas between the perforations of the spinner wall; and this has introduced non-uniform dynamic conditions tending to adversely affect the uniformity of the fibers being produced.

With the foregoing in mind, instead of employing a multiplicity of supply streams distributed vertically over the peripheral spinner wall, the improved arrangement provides for establishing and maintaining an unrestrained, unconfined and downwardly flowing layer of molten glass on the inside surface of the perforated peripheral wall, the feed of the glass being effected to the upper edge of that layer and the layer flowing downwardly in laminar fashion over all of the perforations of the spinner wall, so that the dynamic conditions for projecting the stream of glass through and from each perforation of the peripheral wall are substantially the same, thereby eliminating a source of non-uniformity of the fibers produced.

This development or establishment of the downwardly flowing unconfined layer is effected by the distributor basket arrangement described above in connection with FIGS. 1 and 1a, i.e., by the employment of a basket or distribution system in which all of the glass to be fiberized is delivered to the spinner wall through a single series of orifices close to or in a plane located at or close to the level of the uppermost row of perforations in the spinner wall. This single series of orifices desirably comprises a total of only about 75 to 200 orifices, which is about 1/10 to about ⅛ of the number commonly used in multiple row distributor baskets.

The establishment of the desired uniform conditions for feed of the glass through the perforations in the spinner wall is further enhanced by certain other preferred operating conditions described hereinafter, particularly the maintenance of temperature conditions which will establish substantially uniform viscosity of the glass in the upper and lower regions of the spinner wall.

For the purpose of the attenuation, the structure, as shown in FIG. 1, includes an annular chamber 20 with an annular delivery orifice 21, the chamber 20 being fed from one or more combustion chambers such as indicated at 22 supplied with appropriate means for burning fuel and thus producing the desired hot attenuating gases. This provides a downwardly directed annular stream of attenuating gas in the form of a curtain surrounding the spinner. The details of construction of the spinner mounting structure and of the blast generator need not be considered herein as they are well known in this art.

As seen in FIG. 1, the equipment also includes a means for heating the lower edge of the spinner. This may take a variety of forms and preferably comprises a high frequency heating device in annular form, as indicated at 23. The heater ring is desirably larger in diameter than the spinner and is preferably spaced slightly below the bottom of the spinner.

OPERATING CONDITIONS AND PARAMETERS

Turning now to the operation of an embodiment such as illustrated in FIG. 1, it is first pointed out that while various features herein disclosed may be used with spinners of any size, it is contemplated according to the preferred practice of the improved technique that the spinner be of larger diameter than has been customary heretofore. For example, the spinner may be of the order of 400 mm in diameter, as compared with 300 mm which has been typical with many spinners heretofore employed. This makes possible the employment of a substantially increased number of glass delivery orifices in the peripheral wall of the spinner, which is of advantage in order to increase the number of streams of glass projected from the spinner into the surrounding blast for attenuation. Because of the relatively high rates of rotation of spinners of this type, the spinner wall is subjected to a very substantial centrifugal force; and since the spinner operates at elevated temperature, there is always a tendency for the mid region of the peripheral wall to bow outwardly. This tendency is resisted by the use of reinforcement or bracing means, several forms of which are disclosed in the various embodiments shown in the drawings. In the embodiment of FIG. 1, the reinforcing means takes the form of an annular element 16 mounted by means of the inturned flange 15 at the lower edge of the peripheral wall. The reinforcing action of this annular element 16 will be understood if it is kept in mind that the tendency for the central region of the peripheral wall 13 to bow outwardly under the action of centrifugal force tends to flex the flange 15 upwardly and inwardly about the line of junction of the flange with the lower edge of the wall 13. If the annular element 16 were not present (as is the case in prior spinners) a limited amount of this upward and inward flexing of the flange 15 is accommodated by the formation of slight "waves" or ripples in the relatively thin inner edge of the flange 15. However, with the annular element 16 joined to the inner edge of the flange such rippling of the inner edge of the flange is inhibited, thereby providing reinforcement or bracing of the wall structure of the spinner. The angular junction of the element 16 with the flange 15 also aids in providing the desired reinforcement.

For the purpose just described, the bracing element 16 preferably has a dimension axially of the spinner greater than the average wall thickness of the peripheral spinner wall 13 and desirably even greater than the maximum thickness of the spinner wall. Moreover, in order to provide the desired action for resisting the outward bowing of the peripheral wall, the annular element is desirably mounted in position projecting downwardly from the inner edge of the flange 15. It has been found that reinforcement of the spinner in the manner disclosed herein results in retarding the bowing of the spinner wall, with consequent increase in the useful life of the spinner.

Other configurations of structures for accomplishing this reinforcing action are disclosed in other figures described hereinafter.

Before considering a preferred operation of an embodiment of the equipment such as shown in FIG. 1, it is first pointed out that in a typical prior art operation employing a spinner with a relatively soft glass, the glass is customarily delivered into a distributor basket mounted in the central region of the spinner and having a peripheral wall with a plurality of vertically spaced rows of glass distributing orifices so that the glass is delivered from the basket throughout at least most of the vertical dimension of the peripheral wall of the spinner. In such a prior typical operation, a substantial temperature differential exists as between the upper edge portion of the peripheral wall and the lower edge portion of the peripheral wall. Thus, the upper edge portion is at higher temperatures than the lower edge portion, primarily because of the proximity of the upper edge portion to the origin of the attenuating blast. Moreover, in a typical case, the peripheral wall is of the same thickness throughout its height, or in some cases is thicker toward the top edge than toward the bottom edge. In addition, in this prior typical technique, there may be some differential in the size (diameter) of the orifices in the upper rows of the spinner as compared with the lower rows thereof. These various factors have heretofore been established in order to provide for projection of the glass streams to a greater extent from the upper orifices than from the lower orifices, in order to obtain what has been referred to as "umbrella" fiberization, as disclosed, for example, in FIG. 3 of the Charpentier et al U.S. Pat. No. 3,304,164. This avoids having the fibers cross each other and become entangled or fused to each other in the fiberizing zone, as is the case if the glass streams are projected to the same extent from both the lower and upper rows of orifices.

Although the lower edge of the spinner in certain of these prior art techniques has been subjected to some heating in addition to that resulting from the surrounding attenuating blast and the introduction of the molten glass, the achievement of umbrella fiberization in the typical prior art techniques has most commonly required operation at a differential in the glass temperature as between the upper edge of the spinner and the lower edge of the spinner. The upper edge of the spinner was at a higher temperature because of factors already referred to, and the lower edge of the spinner was commonly at lower temperature, even where some heat was added; and because of this differential in temperature, for instance from about 1050° C. toward the top to 950° C. toward the bottom, the resultant viscosity of the glass was lower at the top than at the bottom, with consequent greater flow or pull rate through the upper holes, and the streams of glass were therefore projected farther at the top than at the bottom of the spinner, and this achieved the desired umbrella fiberization.

With the prior art techniques employing soft glasses, such a temperature differential between the upper edge and the lower edge of the spinner could be resorted to for the purposes referred to because with the soft glass even when the temperature was elevated substantially above the devitrification temperature (and the glass employed at that elevated temperature adjacent the upper rows of orifices), the temperature was still not so high as to result in serious adverse effect upon the metal of the spinner.

In contrast with the foregoing, with a hard glass, it is not practical to operate with a substantial temperature differential between the upper and lower edge portions of the spinner. The reason for this is that if the temperature at the lower edge portion is established at a level sufficiently above the devitrification temperature to avoid crystallization of any of the glass, with consequent clogging of the lower rows of orifices, then in order to establish the temperature differential frequently used in the prior art techniques to accomplish the umbrella fiberization, it would be necessary to elevate the glass temperature adjacent the upper edge of the spinner to such a high value that the spinner is subjected to prohibitive corrosion, erosion and/or distortion.

Taking these factors into account, the improved technique provides for the accomplishment of the desired umbrella fiberization in a novel manner when employing hard glass compositions. Instead of utilizing a temperature differential between the upper and lower edges of the spinner, the improved technique establishes approximately the same temperature at the upper and lower edge of the spinner, and this temperature is established at a level (for instance 1050° C.) which is above and yet relatively close to the devitrification temperature. The viscosity of the glass will therefore be essentially the same toward the top and bottom rows of orifices of the spinner, for example about 5000 poises; and the desired increased resistance to projection of the glass streams from the lower rows of orifices is achieved in accordance with the improved technique in a different manner. Thus, in contrast with the prior art, the improved technique contemplates utilizing a peripheral spinner wall which is of greater thickness toward the bottom edge than toward the top edge, as is clearly shown in FIG. 1. This results in orifices toward the bottom edge which are of greater length and which, with a given viscosity of the glass, offer a greater resistance to projection of the glass streams under the action of centrifugal force. With such greater resistance to projection of the streams, the streams will be projected to a greater extent at the upper edge of the spinner as compared with the lower edge, thereby producing the desired umbrella fiberization. If desired, the resistance to projection of the glass streams through the orifices in the lower rows may be further increased by utilizing orifices of smaller diameter in the lower rows.

For establishing the desired temperature at the lower edge portion of the spinner, it is contemplated to provide more intense heating of the lower edge of the spinner than has heretofore been utilized. Thus, the heater 23 in FIG. 1 should have at least two to three times the power of heaters heretofore used. A heater of 60 kw capacity at 10,000 Hz is suitable.

In the preferred practice herein disclosed, it is contemplated that conditions be maintained establishing a temperature of the glass in the region of both the top and bottom portions of the peripheral spinner wall at a level from about 10° C. to about 20° C. above the devitrification temperature of the glass being used.

For most purposes, it is also contemplated that the lower edge portion of the peripheral wall of the spinner should be at least about 1½ times the thickness of the upper edge portion of the peripheral wall of the spinner; and in some cases, it may be desirable to proportion the spinner wall so that the lower edge portion is as much as 2½ times the thickness of the upper edge portion. A spinner having a lower edge portion approximately twice the thickness of the upper edge portion is typical in the practice of the present invention. For example, in such a typical spinner, the upper edge portion of the spinner may be 3 mm in thickness and the lower edge 6 mm in thickness.

FIGS. 10 and 11

At this point, attention is further directed to FIG. 10 which illustrates on an enlarged scale the cross section of a peripheral spinner wall having a greater thickness toward the bottom than toward the top. Although the increase in thickness from top to bottom may be substantially uniform, as is illustrated in FIG. 1, the alternative as shown in FIG. 10 may also be employed. In this alternative, it will be noted that the thickest part of the wall is toward the bottom edge and the thinnest part in the mid region, while the upper edge portion is of intermediate thickness. This type of graduation of wall thickness may be employed to advantage to even more accurately establish the desired umbrella fiberization. In this connection, it should be kept in mind that the two principal sources of heating the peripheral wall are the attenuating blast toward the top, and the induction heater 23 toward the bottom. In consequence of this, the mid region of the peripheral wall will assume a temperature somewhat lower than either the top or the bottom edges, and the viscosity of the glass in the mid region would therefore be correspondingly higher. The change in wall thickness, as shown in FIG. 10, would therefore assist in establishing the extent of flow and projection of the glass desired, i.e., maximum flow and projection at the top, intermediate flow and projection in the mid region and minimum flow and projection at the bottom.

Although in FIG. 1 and in FIG. 10, the outer surface of the wall is shown as being conical, i.e., of slightly larger diameter toward the bottom than toward the top, the outer surface may be cylindrical, as is shown in FIG. 11.

ADDITIONAL STATEMENT OF PARAMETERS

Before proceeding with description of alternative embodiments and other related features, such as are illustrated in FIGS. 2 to 9 inclusive, it is desired to point out certain additional parameters, including ranges of both structural and operational features of the invention.

Although various features of the invention may be utilized in association with spinners having a coefficient of perforation (i.e., the ratio of the entire perforation area to total area) of the peripheral wall of the order of magnitude employed in the prior art, some features herein contemplated are advantageously used in association with a spinner having an increased number of holes per unit of surface area of the peripheral wall. By such increase in the coefficient of perforation, it is possible to increase the pull rate of the spinner, i.e., the total quantity of glass fiberized by the spinner.

In analyzing this matter, it must be kept in mind that the rate of delivery of glass through the perforations of the spinner wall is greatly influenced by the viscosity of the glass being delivered. Increase in viscosity will retard the flow through each individual perforation; but with an increased coefficient of perforation, a given overall pull rate for a spinner may be maintained even with glass of higher viscosity. Increase of the perforation coefficient, therefore, provides for utilization of glasses at a higher viscosity than customarily employed with spinners, without resulting in decrease of the overall pull rate of the spinner.

As the pull rate is also dependent upon the diameter of the individual perforations, a given pull rate per spinner may be maintained even with individual perforations of decreased diameter, provided that the perforation coefficient is sufficiently increased.

Although the disclosed technique contemplates increase in the overall production or pull rate of a given spinner, it is also contemplated that this be accomplished while at the same time reducing the rate of passage of the glass through the individual perforations in the spinner wall. This result may be achieved in part by increasing the coefficient of perforation (as already pointed out above) and also by certain other factors mentioned hereinafter; and in consequence, erosion and deterioration of the spinner is reduced, notwithstanding the increase in overall pull rate. The erosion is, of course, concentrated in the individual perforations and it is unexpected that despite the increase of the perforation coefficient (which would be expected to weaken the spinner), the output and life of the spinner is not reduced; but may even be somewhat extended compared with prior techniques.

Moreover, with a decreased rate of flow of the glass through the individual perforations, the velocity of the attenuating blast delivered adjacent the outside surface of the peripheral spinner wall need not be as high as in the case of a higher rate of flow through the individual perforations. This has a two-fold advantage.

First, it provides for the production of fibers of greater length, because as is known, the length of the fibers produced by a spinner of the type here under consideration is, in general, inversely proportional to the speed of the attenuation gases. Second, the decrease in the speed of the attenuation gases effects an energy saving.

Increase in the perforation coefficient also provides for attenuation of a larger number of filaments in a given volume of the attenuation gases and this represents a further capability for energy conservation. It has been found that in the technique herein disclosed, notwithstanding the increase in the number of filaments per unit of volume of the attenuating gases, the fibers produced do not have pockets or areas of conglomerated fibers, but the fibers remain individually isolated from each other during their entire attenuation, thereby producing fibrous products such as insulation of high quality.

It is herein contemplated that for most purposes the coefficient of perforation should be such as to provide at least 15 perforations per square centimeter of the perforated part of the peripheral wall; for instance, between 15 perforations and 45 or 50 perforations per square centimeter. A preferred value is about 35 perforation per square centimeter. The diameter of the perforations used is preferably from about 0.8 mm to about 1.2 mm.

Although certain features may be used with spinners of any diameter, for many purposes, it is contemplated to increase in the diameter of the spinner, as compared with spinners used in the prior art. Thus, whereas a typical spinner according to the prior art has a diameter of about 300 mm, it is herein contemplated that the spinner may have a diameter of at least 400 mm and as high as 500 mm.

Increase in the diameter of the spinner also presents certain advantages. Thus, for a given perforation coefficient and the same pull rate of glass through the spinner, an increase in diameter provides for a decrease of the rate of flow of glass through the individual orifices. As pointed out above in connection with the increase in the coefficient of perforation, the decrease in rate of flow through the individual perforations may even permit some increase in the viscosity of the glass being delivered. Even at the same overall pull rate for the spinner, glass at the higher viscosity will not produce excessive wear because of the lower flow rate through the individual orifices.

Although certain features may be employed with spinners in which the peripheral wall is of any desired vertical dimension, it is also contemplated that for some purposes the peripheral wall of the spinner may be of increased height, even twice as high as prior spinners, for instance, the height of the spinner may be increased from about 40 mm to about 80 mm. Such increase in height may be resorted to for increasing the total number of perforations provided, and increase in the total number of perforations provided in this way is advantageous because an increased number of glass streams or primaries are projected into the attenuation current, thereby effecting a further energy conservation.

DETAILED DESCRIPTION OF FIGS. 2 TO 9 INCLUSIVE

Turning now to the embodiment illustrated in FIG. 2, it is noted that a central spinner mounting shaft 10 is again provided, at the lower end of which the hub structure 24 is mounted, providing for support of the spinner generally indicated at 25. As in the first embodiment, an annular chamber 20 having an annular blast delivery orifice 21 is provided, in order to deliver the attenuating blast adjacent to the peripheral wall of the spinner. In FIG. 2, the diameter of the spinner is somewhat greater than in FIG. 1, and the peripheral spinner wall 26 is again of greater thickness toward the lower edge than toward the upper edge thereof. At the lower edge of the peripheral wall, an inturned flange 27 is provided, this flange being of progressively increasing thickness radially inwardly, with the inner edge having a dimension axially of the spinner at least as great as the average thickness of the wall 26 and preferably greater than the maximum thickness of the wall 26. Bracing is thereby provided to resist outward bowing of the peripheral wall 26 in the central region thereof in the manner disclosed above.

In the embodiment of FIG. 2, a distributor basket 28 is mounted in the center of the spinner, being provided with a series of peripheral orifices 29. The glass stream S enters the basket from above, as in FIG. 1, and the rotation of the delivery basket 28 provides for radially outward discharge of streams 30 of the glass.

Instead of direct delivery of the streams 30 to the inside of the peripheral wall of the spinner, the embodiment of FIG. 2 includes a relay device interposed between the supply basket and the peripheral wall of the spinner. This relay device takes the form of an annular inwardly open funnel 31 having a series of spaced relay orifices in the bottom of the funnel for delivery of streams of glass indicated at 32 to the peripheral wall of the spinner. As in the embodiment first described, it is contemplated that the orifices delivering the streams 32 should be located so as to deliver all of the glass to be fiberized in the region of the upper edge portion of the perforate wall of the spinner, thereby providing for the unobstructed laminar flow downwardly as already described.

In the embodiment of FIG. 2, it will be noted that the diameter of the supply basket 28 is smaller than the diameter of the basket 17 in FIG. 1, notwithstanding the fact that the spinner diameter of FIG. 2 is larger than the spinner diameter in FIG. 1. This proportioning of the parts in question is desirable, because, even with a delivery basket of diameter such as that of the basket 17 shown in FIG. 1, the distance of the perforated spinner wall from the distributor basket would impair the uniformity of the delivered streams and cause fluttering of the streams, with consequent delivery of some of the glass to a region of the spinner wall below the upper edge portion. This is undesirable because it is herein contemplated that all of the glass be delivered substantially in the plane of the uppermost rows of orifices in the spinner wall, so as to provide the desired unobstructed laminar or layered downward flow from the top to the bottom of the peripheral spinner wall.

By employing a distributor basket 28 of somewhat smaller diameter than that shown in FIG. 1, and further employing a relay device such as the annular funnel 31 shown in FIG. 2, the glass delivery can be more accurately effected to the region of the uppermost row of spinner orifices. The funnel 31 may be mounted on a portion of the hub structure 24 by a bracket supporting structure such as indicated in outline at 31a. This mounting preferably includes insulating means (for example, as shown at 46 in FIGS. 7 and 8).

As in FIG. 1, a high frequency induction heating device 23 may also be employed in FIG. 2 in order to provide the desired equalization of temperature of the upper and lower edge portions of the perforate wall of the spinner.

FIG. 3 illustrates an embodiment similar to FIG. 2 and corresponding reference numerals have been applied to parts of the same or closely similar construction. The spinner 25 and also the distributor basket 28 are, in fact, of identical construction as compared with FIG. 2; but in the embodiment of FIG. 3, instead of employing the annular inwardly open funnel 31, the embodiment of FIG. 3 employs a relay device 33 of different construction. This device 33 comprises an annular ring mounted on the hub structure by means of bracket supports 33a (with insulating means, as in FIGS. 7 and 8). The ring has an inwardly open groove for receiving the streams 30 of glass delivered from the basket 28 and the lower edge of the groove is defined by a dam or overflow ridge 34, so that the glass received by the relay ring 33 overflows and is delivered by centrifugal force to the inside of the peripheral wall of the spinner. Preferably, the relay ring 33 is positioned so that the overflow dam will deliver the glass in the plane of the uppermost row of orifices in the spinner wall.

The functioning of the embodiment of FIG. 3 is similar to that of FIG. 2, except that in the case of the funnel 31 of FIG. 2, individual streams 32 of glass are discharged from orifices at the base of a funnel, whereas in FIG. 3, the glass is delivered by the relay device in a body of sheet-like form, as indicated at 35, rather than in individual streams.

Turning now to the embodiment of FIG. 4, the spinner 36 there shown is of substantially increased vertical dimension as compared with the spinners in FIGS. 1, 2 and 3. In FIG. 4, a distributor basket 28 similar to that described above in connection with FIG. 3 is employed, and this basket delivers streams of glass 30 to the annular relay device 33, of construction similar to that described above in connection with FIG. 3. However, in FIG. 4, the relay device 33 does not deliver the glass directly to the inside of the spinner wall; but, instead, delivers the glass into the interior of an annular inwardly open funnel 37 which is mounted on a structure 38 lying within the spinner and connected with the spinner toward its upper edge.

The structure 38 is of generally cylindrical form with its upper edge secured to the neck portion of the spinner and having at its lower edge an annular socket 38a for receiving the down turned edge 36a provided on the inturned flange at the bottom of the spinner. The structure 38 is also connected with a bottom plate 38b. Both the structure 38 and the bottom plate are preferably provided with spaced apertures, as shown. Peripherally spaced anchors or brackets 39 (see also FIG. 9) extend inwardly from the central portion of the peripheral wall of the spinner and serve to mount a ring 39a which engages peripherally spaced sockets 38c provided on the supporting structure 38. The peripheral spacing of the brackets 39 avoids any appreciable restraint or disturbance of the laminar flow of the glass on the inside surface of the spinner wall. The interengagement of the parts 36a–38a, and 39a–38c is arranged to provide freedom for relative vertical expansion and contraction of the supporting structure 38 and the peripheral wall of the spinner. This supporting structure, expecially the parts 39, 39a and 38c, provide effective bracing for the peripheral wall of the spinner, thereby resisting outward bowing of the spinner wall under the action of centrifugal force.

An advantage of this structure is that the supporting members are maintained at a lower temperature; for example, while the spinner peripheral wall is typically at a temperature of about 1050° C. during operation, the supporting structure can be about 600° C., and thus remain more rigid.

Certain details of the construction of the relay funnel 37 and of the mounting structure 38 are illustrated in the enlarged sectional view of FIG. 8. From this view, it will be seen that individual delivery apertures 40 in the base of the funnel are positioned to deliver streams of glass through radially aligned apertures 41 formed in the supporting structure 38.

The spacing of the brackets 39 at intervals around the inside of the spinner wall makes possible the development of the desired laminar flow of the glass from the upper region of the spinner to the lower region thereof, with a minimum of interruption.

Other parts of the equipment, for instance, the journal mounting of the spinner, the annular chamber and annular orifice for the attenuation gases, and the heating element 23 may all be similar to those already described above.

In the embodiment of FIG. 5, the spinner 42 is of construction similar to that of the spinner 36 in FIG. 4, but the spinner in FIG. 5 is of smaller diameter, and for purposes of the glass supply, the arrangement of FIG. 5 includes a central distributor basket 43 of somewhat larger diameter than that shown at 28 in FIG. 4, and this basket has peripheral apertures delivering streams 44 of glass directly into the relay funnel 37, instead of through the intermediation of the overflow relay device 33. This embodiment includes supporting structure 38, a centrally cut-out bottom plate 38b, and connections with the peripheral wall of the spinner, as described above with reference to FIG. 4.

Although various features of the arrangements of FIGS. 4 and 5 may be used with peripheral walls of uniform thickness, it is preferred that the wall thickness be increased toward the bottom edge, for reasons already pointed out.

In FIG. 6, a construction is illustrated similar to that of FIG. 3, the spinner 25 being the same as the spinner in FIG. 3. Moreover, the distributor basket 28 is the same as in FIG. 3; but in FIG. 6, an overflow relay ring 45 is employed and (see also FIG. 7) the ring in this embodiment is mounted directly upon a portion of the spinner wall itself, rather than upon the hub structure, as in FIG. 3.

In the detailed views of FIGS. 7 and 8, it will be noted that in both cases, the mounting of the relay device (37 in FIG. 8 and 45 in FIG. 7) includes an interposed layer of insulating material 46 which is provided in order to diminish heat transfer from the relay device to the spinner, and in the case of the embodiment of FIGS. 4, 5 and 8 in order to diminish heat transfer to the supporting structure 38.

GLASS COMPOSITIONS

One of the highly desirable characteristics of the technique herein disclosed is that the structural and operational features may be employed with a wide range of glass compositions.

Thus, various of the structural and operational features above referred to may be employed individually and in combination with many known attenuable glass compositions, including "soft" glasses. In addition, various of the individual features and combinations may also be used with certain types of glass compositions which have not customarily been employed in prior fiberizing operations employing a centrifugal spinner for the projection of glass primaries into an attenuating blast. Indeed, with the spinner and technique herein disclosed, glass compositions may readily be used which are not practical to use in prior spinner equipment and techniques for various reasons especially because of the relatively high devitrification temperature requiring the use of relatively higher spinner temperature. Such higher spinner temperatures, if used with prior art spinners, would result in deterioration (erosion and/or outward bowing of the peripheral wall) so rapidly that the spinner would not have practical or industrial life. Indeed, with some of the glass compositions contemplated for use in the technique of the present invention, it would be virtually impossible to effect fiberization with prior art spinners.

Still further, it is contemplated to use certain glass compositions not even known heretofore, having desirable temperature/viscosity characteristics particularly suited to use in the improved techniques disclosed; and these novel glass compositions are also advantageous in that they do not incorporate fluorine compounds and may even be substantially free of one or even both of boron or barium compounds, all three of which (fluorine, boron, barium) have heretofore commonly been used individually or in combination in significant quantities in the formulation of glass compositions for fiberization in spinner techniques. In consequence, these particular glass compositions are especially advantageous in that they are economical and substantially free of pollution problems. The novel compositions referred to, having relatively high melting and devitrification temperatures also result in production of fibers having improved temperature-resistant characteristics. Thus, heat insulation products prepared from such novel glass compositions may be safely used in applications in which the insulation is subjected to temperatures as high as 450° to 500° C., which compares with a temperature of about 400° C. for insulation products made with fibers formed of various of the known "soft" glasses.

Preferred glass compositions contemplated for the improved techniques herein disclosed, not only are characterized by various features hereinabove referred to, but in addition, such preferred glasses, desirably have compositions conforming with the examples and ranges given hereinafter. Before specifically identifying such compositions, it should be remembered that under conventional prior art conditions, the glass viscosity used was of the order of 1000 poises at the operating temperature of fiberization. Thus, a devitrification temperature as low as possible was sought; and such low temperatures could only be attained by addition of fluorine compounds or even boron and barium compounds. In contrast, in the improved technique, using the disclosed novel glass compositions, the glass may have a viscosity of the order of 5000 poises at the operating temperature of the spinner, and a spinner temperature of 1030° to 1050° C., i.e., barely above the liquidus, is employed.

In considering the compositions of various glass formulations which may be used with the equipment and technique herein disclosed, it is again noted that the improved equipment and technique may be used with a wide variety of glass formulations heretofore known and used; but particularly desirable results are attained when employing formulations of certain compositions which have not been known, have not been employed heretofore or are not well adapted for use with the prior art spinner techniques. In the Table I just below, 8 different compositions in these categories are identified, with the exception of minor unidentified impurities, all figures representing parts by weight. This table also shows the principal characteristics of these 8 compositions.

TABLE I

| CONSTITUENT | | 0 | 1 | 2 | 3 | 4 | 5 | 6 | 7 |
|---|---|---|---|---|---|---|---|---|---|
| $SiO_2$ | | 66.9 | 63.15 | 62.6 | 62.7 | 61.6 | 63.45 | 62.1 | 60.3 |
| $Al_2O_3$ | | 3.35 | 5.05 | 5.2 | 5.15 | 5.9 | 5.25 | 5.85 | 6.35 |
| $Na_2O$ | | 14.7 | 13.2 | 15.15 | 15.2 | 13.8 | 14.95 | 14.55 | 14.95 |
| $K_2O$ | | 1 | 2.1 | 2.3 | 2.3 | 2.45 | 2.25 | 2.7 | 2.65 |
| CaO | | 7.95 | 5.9 | 5.25 | 5.5 | 5.95 | 5.4 | 5.75 | 6.25 |
| MgO | | 0.3 | 2.65 | 3.35 | 3.35 | 2.6 | 4 | 2.75 | 2.4 |
| BaO | | trace | 2.9 | 4.85 | 2.7 | 3.2 | trace | trace | trace |
| MnO | | 0.035 | 2 | trace | 1.5 | 3.05 | 3 | 3.4 | 2.9 |
| $Fe_2O_3$ | | 0.49 | 0.78 | 0.79 | 0.85 | 0.89 | 0.84 | 1.88 | 3.37 |
| $SO_3$ | | 0.26 | 0.55 | 0.5 | 0.52 | 0.45 | 0.51 | 0.4 | 0.36 |
| $TiO_2$ | | trace | trace | trace | trace | trace | trace | trace | trace |
| $B_2O_3$ | | 4.9 | 1.5 | trace | trace | trace | trace | trace | trace |
| PROPERTIES VISCOSITY | | | | | | | | | |
| T(log = 2) | °C. | 1345 | 1416 | 1386 | 1403 | 1410 | 1402 | 1405 | 1395 |
| T(log = 2.5) | °C. | 1204 | 1271 | 1249 | 1264 | 1270 | 1265 | 1266 | 1257 |
| T(log = 3) | °C. | 1096 | 1161 | 1141 | 1156 | 1158 | 1160 | 1158 | 1150 |
| T(log = 3.7) | °C. | 975 | 1042 | 1028 | 1038 | 1042 | 1045 | 1038 | 1030 |
| DEVITRIFICATION | | | | | | | | | |
| Liquidus | °C. | 970 | 1020 | 960 | 1015 | 1015 | 1040 | 1020 | 1025 |
| Maximum crystal growth | um/mn | 0.93 | 0.52 | 0.3 | 0.46 | 1.1 | 0.4 | 1.08 | 1.96 |
| At temperature of | °C. | 855 | 900 | 840 | 800 | 900 | 880 | 915 | 920 |
| CHEMICAL RESISTANCE | | | | | | | | | |
| $H_2O$ attackability | mg | 13.6 | 10.8 | 16.5 | 16.8 | 11 | 16.4 | 12.86 | 14.9 |
| Attack Resistance | mg $Na_2O$ | 4.6 | 3.6 | 5.9 | 5.9 | 3.6 | 5.6 | 4.8 | 4.9 |

In connection with the percentages of the several ingredients given above, while the table presents figures from analysis of actual sample glasses, it will be understood by those skilled in the art that some range for each constituent is appropriate, for example, up to about plus or minus five percent while still remaining within the overall range given in Column C of Table II herebelow, because of variations in the chemical composition of batch constituents, variations resulting from volatilization in the glass melting furnace, and limitations on the precision with which the weight values and chemical analysis values can be measured.

Although composition 0 could be fiberized with certain known spinner techniques, such fiberization would not be economically feasible from an industrial point of view, because with known techniques, the production or pull rate would be unacceptably low. However, with the technique of the present invention, composition 0 can be used economically.

The other compositions would be virtually impossible to fiberize on an industrial basis by known centrifugal spinner techniques; and in contract, these other compositions are particularly well adapted to use in the improved technique herein disclosed. Certain of these other formulations, such as, for example, compositions 5, 6 and 7 have not been known heretofore, and of these, composition 6 is preferred.

The equipment and technique herein disclosed may be employed with quite a broad range of glass compositions, for instance, as indicated in column A of Table II herebelow.

SPINNER ALLOY

With some of the hardest glasses, having viscosity of the order of 1000 poises at temperatures above about 1150° C., and having a devitrification temperature of the order of 1030° C., it is herein contemplated that the spinner be formed of an alloy of special composition capable of withstanding the temperatures required. Furthermore, if this alloy is used with softer glasses, the life of the spinner is increased. Such an alloy may be formulated as follows, the parts being indicated as percentages by weight:

TABLE III

| Elements | Range |
|---|---|
| C | 0.65–0.83 |
| Cr | 27.5–31 |
| W | 6–7.8 |
| Fe | 7–10 |
| Si | 0.7–1.2 |
| Mn | 0.6–0.9 |
| Co | 0–0.2 |
| P | 0–0.03 |
| S | 0–0.02 |
| Ni (Balance) | ~59–50 |

Alloys of this type are particularly desirable with spinners of large diameter, for instance of at least 400 mm diameter.

In addition to fiberization of so-called hard glasses, the use of the spinner alloy above referred to also pro-

TABLE II

| | A | B | C |
|---|---|---|---|
| | | | GLASS CONTAINING MANGANESE |
| CONSTITUENTS | GENERAL RANGE | GLASS CONTAINING BARIUM | GLASS CONTAINING IRON |
| $SiO_2$ | 59–65 | 59–65 | 60–64 |
| $Al_2O_3$ | 4–8 | 4–8 | 5–6.5 |
| $Na_2O$ | 12.5–18 | 12.5–18 | 14.5–18 |
| $K_2O$ | 0–3 | 0–3 | 0–3 |
| $R_2O = Na_2O + K_2O$ | 15–18 | 15–18 | 16–18 |
| $Al_2O_3/R_2O$ | 0.25/0.4 | 0.25–0.4 | (0.25–0.4) |
| CaO | 4.5–9 | 4.5–8 | 5–9 |
| MgO | 0–4 | 0–4 | 0–4 |
| MgO/CaO | 0/0.75 | 0/0.75 | 0/0.75 |
| MgO + CaO | 7–9.5 | 7–9.5 | 8–9.5 |
| MnO | 0–4 | 1–3.5 | 1.5–4 |
| BaO | 0–5 | 2–3.5 | trace |
| $Fe_2O_3$ | 0.1–5 | 0.1–1 | 0.8–3.5 |
| $MnO + BaO + Fe_2O_3$ | 3.5–8 | 4–8 | 3.5–6.5 |
| $B_2O_3$ | 0–2 | 0–2 | trace |
| Miscellaneous | $\leq 1$ | $\leq 1$ | $\leq 1$ |
| of which $SO_3$ | $\leq 0.6$ | $\leq 0.6$ | $\leq 0.6$ |

Within the ranges of Column A, it is preferred to use compositions formulated to maintain equilibrium between the viscosity on one hand, and the devitrification temperature and the resistance to water on the other hand, which is particularly difficult to do with glass formulated according to prior art techniques. Columns B and C of Table II give ranges for compositions containing manganese, and also formulated to give the equilibrium above referred to.

The glass of Column B may contain small amounts of boron to which addition of fairly small amounts of barium is contemplated.

Column C, in contrast, comprehends novel compositions such as those numbered 5, 6 and 7 of Table I. These are manganese and iron containing compositions from which deliberate addition of barium and of boron is excluded, although some traces may be present.

vides for fiberization of glasses of a broad range of compositions, including both hard and soft glasses, with which latter (the soft glasses), the use of the spinner alloy increases the life of the spinner. Thus, the spinner formed with the new alloy may be used with glasses having composition within the ranges indicated in Table IV just below:

TABLE IV

| | |
|---|---|
| $SiO_2$ | 59–67 |
| $Al_2O_3$ | 3–8 |
| $Na_2O$ | 12.5–18 |
| $K_2O$ | 0–3 |
| $R_2O = Na_2O + K_2O$ | 15–18 |
| CaO | 4.5–9 |
| MgO | 0–4 |
| MgO/CaO | 0–0.75 |
| MnO | 0–4 |
| BaO | 0–5 |
| $Fe_2O_3$ | 0.1–5 |

TABLE IV-continued

| | |
|---|---|
| B₂O₃ | 0–5 |
| Miscellaneous | ≦1 |
| of which SO₃ | ≦0.6 |

We claim:

1. Glass fiberizing equipment comprising a hollow spinner having a peripheral wall with a plurality of rows of orifices for centrifugal projection of streams of molten glass, having a glass distributing device within the spinner, and a blower generating an annular gas current directed downwardly around the spinner, characterized in that the distributing device comprises means for feeding all of the glass to be fiberized to the region of the uppermost row of spinner orifices, with consequent laminar flow of the glass downwardly on the inside of the peripheral wall of the spinner in a substantially unobstructed layer overlying the rows of orifices, means for heating the lower edge portion of the peripheral wall of the spinner, sufficiently to maintain a glass temperature at the lower edge portion of the peripheral wall approximating the temperature of the glass at the upper edge portion of said peripheral wall, thereby establishing substantial uniformity in the viscosity of the glass in the upper and lower regions of the spinner wall, and the peripheral wall of the spinner being of progressively increasing thickness from the upper to the lower region thereof and the diameter of the spinner orifices and the thickness of the peripheral wall of the spinner in the upper and lower regions thereof being proportioned to establish resistance in the centrifugal delivery of the glass, at a given viscocity, which resistance is higher in the lower rows of orifices than in the upper rows of orifices, thereby providing greater extent of projection of the streams of molten glass from the upper rows of orifices than from the lower rows of orifices, notwithstanding the substantial uniformity of viscosity of the glass projected from the orifices in the upper and lower regions of the peripheral wall.

2. Equipment as defined in claim 1 in which the glass distributing device within the spinner comprises a distributor having a peripheral wall with glass distributing orifices located in or immediately adjoining the plane of the uppermost row of orifices in the peripheral wall of the spinner.

3. Glass fiberizing equipment comprising a hollow spinner having a peripheral wall with a plurality of rows of orifices for centrifugal projection of streams of molten glass and a blower generating an annular gas current directed downwardly around the spinner, characterized in that the spinner has a peripheral wall of greater thickness toward the lower edge portion thereof than toward the upper edge portion thereof, with rows of orifices through both the lower and upper edge portions thereof, means within the spinner for delivering molten glass to the inside of the peripheral wall of the spinner, the delivery means comprising a distributor having a peripheral wall with glass distributing orifices located in or immediately adjoining the plane of the uppermost row of orifices in the spinner wall, the peripheral wall of the distributor being otherwise imperforate, thereby providing for feed of all of the glass to be fiberized to the region of the uppermost row of spinner orifices with consequent laminar flow of the glass downwardly on the inside surface of the spinner wall in an unrestrained and substantially unobstructed layer overlying the other rows of delivery orifices, and means for heating the lower edge portion of the peripheral wall of the spinner sufficiently to maintain a glass temperature at the lower edge portion of the peripheral wall approximating the temperature of the glass at the upper edge portion of said peripheral wall.

4. Method for fiberizing molten glass by the use of a spinner having a peripheral wall with a plurality of rows of orifices for centrifugal projection of streams of the glass, the spinner being positioned within a downwardly directed annular gaseous blast, characterized by using a spinner in which the peripheral wall of the spinner is thicker in the lower region thereof as compared with the upper region thereof to establish resistance to the centrifugal projection of the glass, at a given viscosity, which resistance is higher in the lower rows of orifices than in the upper rows of orifices, feeding all of the glass to be fiberized to the region of the uppermost row of spinner orifices with consequent laminar flow of the glass downwardly on the inside of the peripheral wall of the spinner in an unrestrained and substantially unobstructed layer overlying the rows of delivery orifices, and heating the lower edge portion of the peripheral wall of the spinner sufficiently to maintain a glass temperature at the lower edge portion of the peripheral wall approximating the temperature of the glass at the upper edge portion of said peripheral wall, thereby maintaining the viscosity of the glass substantially uniform in the upper and lower regions of the spinner wall.

5. Method for fiberizing molten glass by the use of a spinner having a peripheral wall with a plurality of rows of orifices for centrifugal projection of streams of the glass, the spinner being positioned within a downwardly directed annular gaseous blast, characterized by feeding all of the glass to be fiberized to the region of the uppermost row of spinner orifices with consequent laminar flow of the glass downwardly on the inside of the peripheral wall of the spinner in an unrestrained and substantially unobstructed layer overlying the rows of delivery orifices, and heating the lower edge portion of the peripheral wall of the spinner sufficiently to maintain a glass temperature at the lower edge portion of the peripheral wall approximating the temperature of the glass at the upper edge portion of said peripheral wall, thereby maintaining the viscosity of the glass substantially uniform in the upper and lower regions of the spinner wall.

6. Method for fiberizing molten glass by the use of a spinner having a peripheral wall with a plurality of rows of orifices for centrifugal projection of streams of the glass, the spinner being positioned within a downwardly directed annular gaseous blast, characterized by feeding all of the glass to be fiberized to the region of the uppermost row of spinner orifices with consequent laminar flow of the glass downwardly on the inside of the peripheral wall of the spinner in an unrestrained and substantially unobstructed layer overlying the rows of delivery orifices.

7. Method for fiberizing molten glass by the use of a spinner having a peripheral wall with a plurality of rows of orifices for centrifugal projection of streams of the glass, the spinner being positioned within a downwardly directed annular gaseous blast, characterized by using a spinner in which the diameter of the spinner orifices and the thickness of the peripheral wall of the spinner in the upper and lower regions thereof are proportioned to establish resistance to the centrifugal projection of the glass, at a given viscosity, which resistance is higher in the lower rows of orifices than in the upper rows of orifices, feeding all of the glass to be fiberized to the region of the uppermost row of spinner orifices with consequent laminar flow of the glass downwardly on the inside of the peripheral wall of the spinner in an unrestrained and substantially unobstructed layer overlying the rows of delivery orifices, and heating the lower edge portion of the peripheral wall of the spinner sufficiently to maintain a glass temperature at the lower edge portion of the peripheral wall approximating the temperature of the glass at the upper edge portion of said peripheral wall, thereby maintaining the viscosity of the glass substantially uniform in the upper and lower regions of the spinner wall.

8. Glass fiberizing equipment comprising a hollow spinner having a peripheral wall with a plurality of rows of orifices for centrifugal projection of streams of molten glass, having glass supply and distributing mechanism within the spinner, and a blower generating an annular gas current directed downwardly around the spinner, characterized in that said mechanism comprises glass supply means for feeding glass outwardly from a central region within the spinner, said mechanism further including glass relay means comprising an annular relay device within the spinner interposed radially between the supply means and the peripheral wall of the spinner, the relay device having means for delivering the relayed glass to the region of the uppermost row of spinner orifices, with consequent flow of the glass downwardly on the inside of the peripheral wall of the spinner over the other rows of the delivery orifices.

9. Equipment as defined in claim 8 in which the relay means comprises an annular inwardly open channel having an overflow dam at one edge positioned to relay the glass in a plane in the region of the uppermost row of orifices.

10. Equipment as defined in claim 8 in which the relay means comprises an annular inwardly open funnel having relay orifices in the bottom of the funnel positioned to relay the glass in a plane in the region of the uppermost row of orifices.

11. Equipment as defined in claim 9 and further including an annular relay funnel radially interposed between said channel and the peripheral wall of the spinner and having relay orifices in the bottom of the funnel positioned to relay the glass in a plane in the region of the uppermost row of orifices.

12. Equipment as defined in claim 8 in which the glass supply means comprises a basket mounted within and rotating with the spinner and having a peripheral wall with glass distributing orifices located in or immediately adjoining the plane of the relay means.

13. Glass fiberizing equipment comprising a hollow spinner having a peripheral wall with orifices for centrifugal projection of streams of molten glass and a blower generating a downwardly directed annular current of attenuating gas around the spinner for attenuating the streams of glass delivered through the spinner orifices, characterized by a spinner having a peripheral wall of greater thickness toward the lower edge thereof than toward the upper edge thereof and having rows of orifices through both the lower and upper portions thereof, and means within the spinner for delivering glass to the inside of the peripheral wall of the spinner, the delivery means providing for delivery of glass to the region of the uppermost row of orifices in a quantity sufficient to supply glass to all of the rows of glass orifices and at a rate providing flowing of the glass downwardly in an unrestrained layer on the inside surface of the peripheral wall of the spinner for projection through the orifices of the lower rows.

14. Equipment as defined in claim 13 in which the peripheral wall of the spinner is thickest at the lower edge, thinnest in an intermediate region and of intermediate thickness at the upper edge.

15. Equipment as defined in claim 13 in which the external surface of the peripheral wall is substantially cylindrical.

16. Equipment as defined in claim 14 in which the external surface of the peripheral wall is substantially cylindrical.

17. Equipment as defined in claim 1 and further including means for resisting outward bowing of the mid-region of the peripheral wall of the spinner under the influence of centrifugal force.

18. Equipment as defined in claim 17 in which said resisting means comprises a bracing structure mounted interiorly of the spinner and connected at circumferentially spaced points with the mid region of the peripheral wall.

19. Equipment as defined in claim 17 in which said resisting means comprises an annular element connected with the lower edge of the peripheral wall of the spinner.

20. Method for fiberizing molten glass by the use of a spinner having a peripheral wall with a plurality of rows of perforations for centrifugal projection of streams of the glass, the spinner being positioned on an upright axis within a downwardly directed annular gaseous blast, characterized by establishing an unrestrained, unconfined and downwardly flowing layer of molten glass on the inside of the perforated peripheral wall of the spinner by feeding all of the molten glass to be fiberized to the inside of the peripheral wall substantially in the plane of the uppermost row of perforations.

* * * * *